(12) United States Patent
Bowman

(10) Patent No.: US 9,099,056 B2
(45) Date of Patent: Aug. 4, 2015

(54) METHOD OF LABELLING A HIGHLY CURVED PATH ON A MAP RENDERED ON A WIRELESS COMMUNICATIONS DEVICE

(75) Inventor: Gordon Gregory Bowman, Kemptville (CA)

(73) Assignee: BlackBerry Limited, Waterloo, CA (US)

( * ) Notice: Subject to any disclaimer, the term of this patent is extended or adjusted under 35 U.S.C. 154(b) by 1846 days.

(21) Appl. No.: 11/685,912

(22) Filed: Mar. 14, 2007

(65) Prior Publication Data

US 2007/0229513 A1 Oct. 4, 2007

Related U.S. Application Data

(60) Provisional application No. 60/788,434, filed on Mar. 31, 2006, provisional application No. 60/787,541, filed on Mar. 31, 2006.

(51) Int. Cl.
*G09G 5/377* (2006.01)
*G06F 17/21* (2006.01)
*G06T 11/60* (2006.01)
*G06T 17/05* (2011.01)
(Continued)

(52) U.S. Cl.
CPC .............. *G09G 5/377* (2013.01); *G01C 21/367* (2013.01); *G01C 21/3673* (2013.01); *G06F 3/0481* (2013.01); *G06F 17/211* (2013.01); *G06F 17/30241* (2013.01); *G06F 17/30905* (2013.01); *G06T 11/60* (2013.01); *G06T 17/05* (2013.01); *G06T 19/00* (2013.01); *G08G 1/0969* (2013.01); *G08G 1/096805* (2013.01); *G09B 29/10* (2013.01); *G09B 29/106* (2013.01); *G06F 3/147* (2013.01); *G06T 2219/004* (2013.01); *G09G 2340/0492* (2013.01); *G09G 2340/145* (2013.01)

(58) Field of Classification Search
CPC .............. G01C 21/367; G01C 21/3673; G06F 17/211; G06F 17/30241; G06F 17/30905; G06F 3/0481; G06F 3/147; G06T 11/60; G06T 17/05; G06T 19/00; G06T 2219/004; G08G 1/096805; G08G 1/0969; G09B 29/10; G09B 29/106; G09G 2340/0492; G09G 2340/145
USPC ........................................................ 345/468
See application file for complete search history.

(56) References Cited

U.S. PATENT DOCUMENTS

| | | | | |
|---|---|---|---|---|
| 6,154,219 A | * | 11/2000 | Wiley et al. | 345/587 |
| 7,028,260 B1 | * | 4/2006 | Morsello | 715/210 |
| 2003/0229441 A1 | * | 12/2003 | Pechatnikov et al. | 701/201 |

OTHER PUBLICATIONS

Oxford Dictionary Online: definition for "collinear", http://dictionary.oed.com/cgi/entry/50044053?query_type=word&queryword=collinear&first=1&max_to_show=10&single=1&sort_type=alpha&case_id=ypNf-R4XbX3-7601&p=1&d=1&sp=1&qt=1&ct=0&ad=1&print=1; retrieved Jul. 14, 2010.*

(Continued)

*Primary Examiner* — Carlos Perromat
(74) *Attorney, Agent, or Firm* — Moffat & Co.

(57) ABSTRACT

In displaying a map on a wireless communications device, a method is provided that resolves labelling of sharp curves. The method entails a determination of whether a curvature of a map element associated with the map feature exceeds a predetermined threshold (e.g. whether a rate of change in slope of a path or the change in angular orientation of each successive character in the label exceeds a threshold that is a function of zoom level. If the curvature exceeds the threshold, the label is rendered on the map in a new map location that avoids the map location where the curvature exceeds the threshold.

30 Claims, 15 Drawing Sheets

(51) Int. Cl.
  *G06F 3/147* (2006.01)
  *G01C 21/36* (2006.01)
  *G06F 3/0481* (2013.01)
  *G06F 17/30* (2006.01)
  *G06T 19/00* (2011.01)
  *G08G 1/0968* (2006.01)
  *G08G 1/0969* (2006.01)
  *G09B 29/10* (2006.01)

(56) References Cited

OTHER PUBLICATIONS

The Free Dictionary; Dictionary Entry for Collinear; http://www.thefreedictionary.com/collinear; retrieved Mar. 10, 2011.*
Merriam-Webster; Entry for Collinear; http://www.merriam-webster.com/dictionary/collinear; retrieved Mar. 10, 2011.*

* cited by examiner

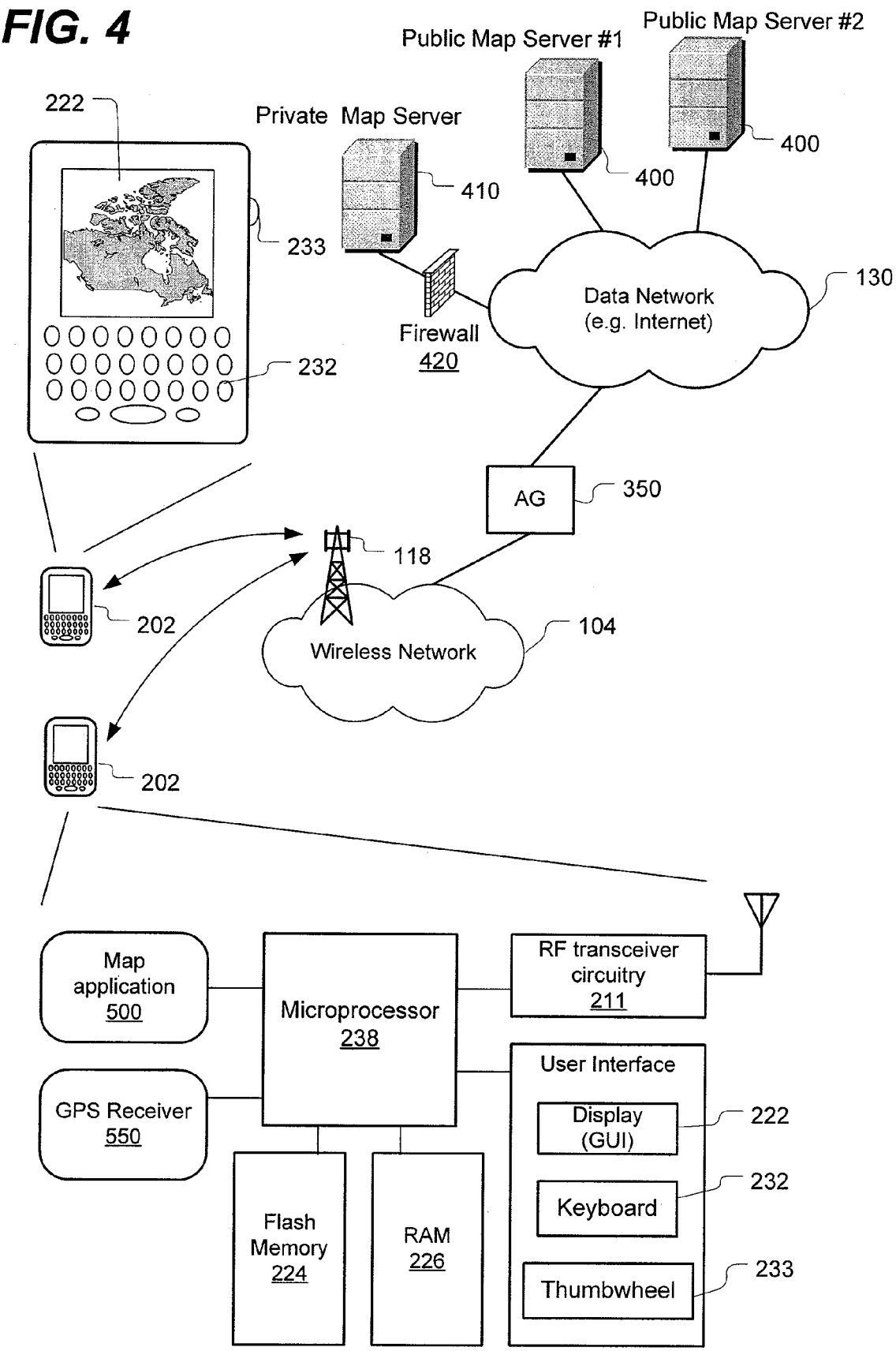

FIG. 13
FIG. 14
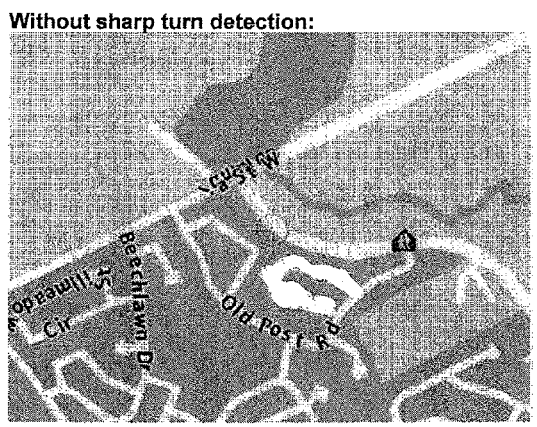
Without sharp turn detection:
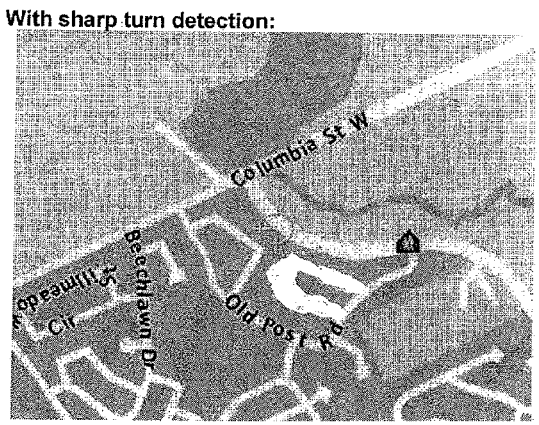
With sharp turn detection:

METHOD OF LABELLING A HIGHLY CURVED PATH ON A MAP RENDERED ON A WIRELESS COMMUNICATIONS DEVICE

CROSS-REFERENCE TO RELATED APPLICATIONS

This is the first application filed for the present invention.

TECHNICAL FIELD

The present disclosure relates generally to wireless communications devices and, in particular, to techniques for generating map content on wireless communications devices.

BACKGROUND

Wireless communications devices such as the BlackBerry™ by Research in Motion Limited enable users to download map content from web-based data sources such as BlackBerry Maps™, Google Maps™ or Mapquest™. Downloaded map content is displayed on a small LCD display screen of the wireless communications device for viewing by the user. The user can pan up and down and side to side as well as zoom in or out. Due to the small display on the device and due to the limited over-the-air (OTA) bandwidth, there is a need to optimize the delivery and handling of the map data.

With the increasing availability of wireless communications devices having onboard Global Positioning System (GPS) receivers for providing location-based services (LBS), the efficient delivery and handling of map data is increasingly important.

One problem that arises with current map-rendering technologies occurs when attempting to render a label on a path that turns sharply. Conventional text-on-path algorithms will sometimes place the label where the path sharply turns, thereby resulting in a label that is not aesthetically pleasing and difficult to read.

A related problem arises when a label is rendered on a path that changes girth, for example when a four-lane path becomes a two-lane path. To render this path, a single path segment may be made to loop back on itself with a slight offset, to thus represent the wider four-lane path while a new vector path segment is rendered from the looping point onward to represent the narrower two-lane path. Since the path segments are rendered with thickness, the paths themselves appear fine onscreen. However, a label that is rendered along such a path, in the section containing the sharp turn is seldom aesthetically pleasing. Depending on the zoom level, the label itself can sometimes appear to be folded back on itself. Therefore, a technique for resolving sharp turns to enable efficient and aesthetically-pleasing labelling of paths having sharp turns thus remains highly desirable.

BRIEF DESCRIPTION OF THE DRAWINGS

Further features and advantages of the present technology will become apparent from the following detailed description, taken in combination with the appended drawings, in which:

FIG. 4 is a schematic depiction of a wireless network having an applications gateway for optimizing the downloading of map data from map servers to wireless communications devices;

FIG. 13 is a screenshot of a map rendered without detecting and avoiding sharp turns, showing how the path label "Columbia St W" is folded back on itself as the street transitions from four lanes to two; and FIG. 14 is a screenshot of a map rendered after first detecting and avoiding sharp turns, showing how the path label "Columbia St W" is displaced to avoid the high-curvature transition point where the street goes from four to two lanes.

It will be noted that throughout the appended drawings, like features are identified by like reference numerals.

DETAILED DESCRIPTION OF THE EMBODIMENTS

The present technology provides, in general, a method of efficiently and aesthetically presenting labels on a map rendered on a display of a wireless communications device. If a label is to be rendered along a portion of a path where the curvature exceeds a predetermined threshold, then the label is repositioned to a new location where the curvature is less than the threshold. Points or zones of excessive curvature can be designated as such using a collision-avoidance array, which can also be used to ascertain that labels do not collide or interfere with other labels.

Thus, an aspect of the present technology is a method of displaying a map on a wireless communications device that includes steps of obtaining map data for rendering the map to be displayed on the wireless communications device, the map data including label data for rendering a label for identifying a map feature on the map and determining whether a curvature of a map element associated with the map feature exceeds a predetermined threshold. If the curvature exceeds the predetermined threshold, the label is rendered on the map in a new map location that avoids the map location where the curvature exceeds the predetermined threshold.

Another aspect of the present technology is a computer program product comprising code adapted to perform the steps of the foregoing method when the computer program product is loaded into memory and executed on a processor of a wireless communications device.

Yet another aspect of the present technology is a wireless communications device for enabling a user of the device to display a map on the device that includes an input device for enabling the user to cause the device to obtain map data for rendering the map to be displayed on a display of the device, the map data including label data for rendering labels on the map for identifying one or more map features. The wireless communications device further includes a memory for storing code to instruct a processor to obtain map data for rendering the map to be displayed on the wireless communications device, the map data including label data for rendering a label for identifying a map feature on the map, determine whether a curvature of a map element associated with the map feature exceeds a predetermined threshold, and render the label on the map in a new map location that avoids the map location where the curvature exceeds; the predetermined threshold.

The details and particulars of these aspects of the technology will now be described below, by way of example, with reference to the attached drawings.

Figure 1:
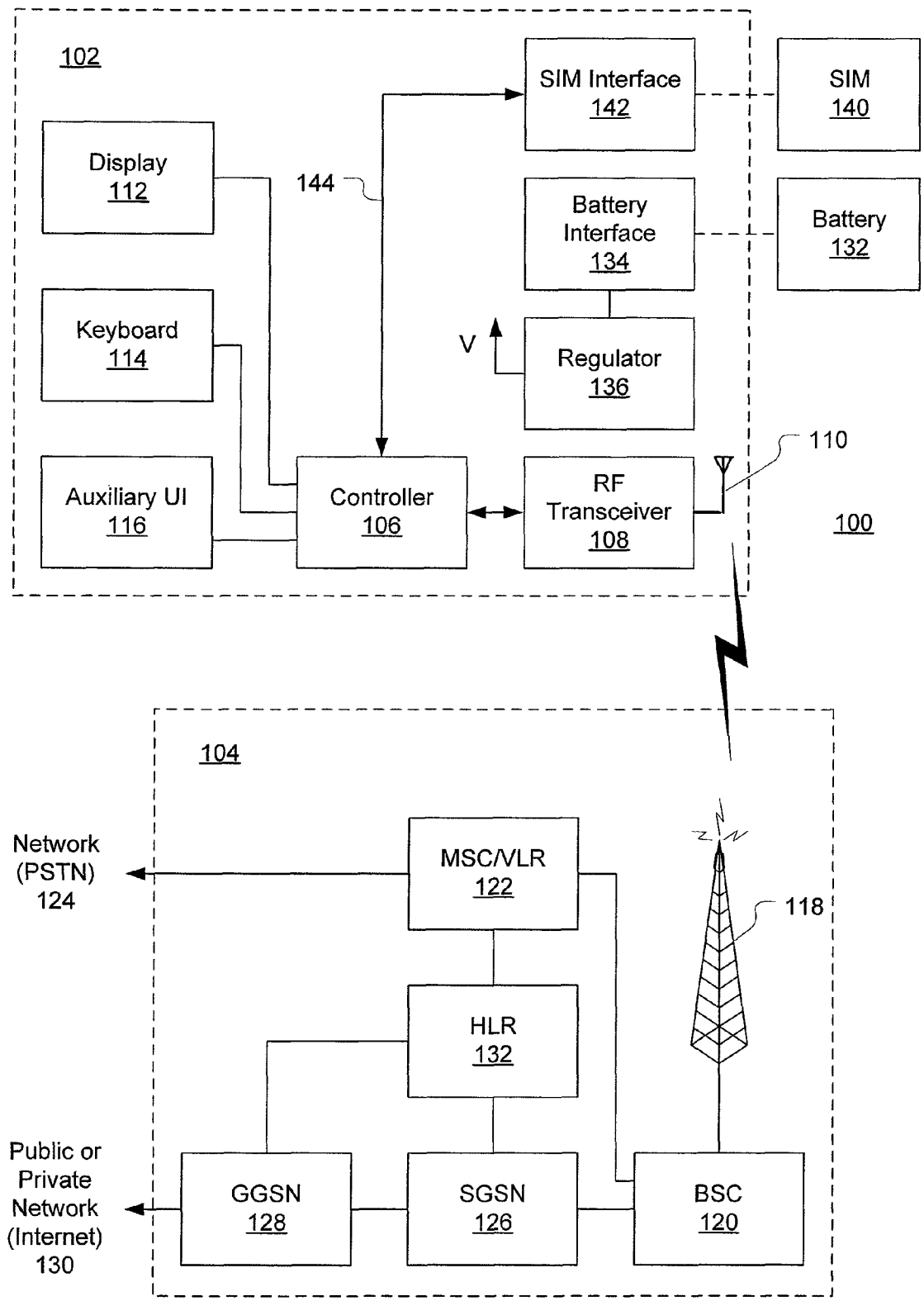
FIG. 1 is a block diagram schematically illustrating pertinent components of a wireless communications device and of a wireless communications network.

FIG. 1 is a block diagram of a communication system 100 which includes a wireless communications device 102 (also referred to as a mobile communications device) which communications through a wireless communication network 104. For the purposes of the present specification, the expression "wireless communications device" encompasses not only a wireless handheld, cell phone or wireless-enabled laptop but also any mobile communications device or portable communications device such as a satellite phone, wireless-enabled PDA or wireless-enabled MP3 player. In other words, for the purposes of this specification, "wireless" shall be understood as encompassing not only standard cellular or microwave RF technologies, but also any other communications technique that conveys data over the air using an electromagnetic signal.

The wireless communications device 102 preferably includes a visual display 112, e.g. an LCD screen, a keyboard 114 (or keypad), and optionally one or more auxiliary user interfaces (UI) 116, each of which is coupled to a controller 106. The controller 106 is also coupled to radio frequency (RF) transceiver circuitry 108 and an antenna 110. Typically, controller 106 is embodied as a central processing unit (CPU) which runs operating system software in a memory device (described later with reference to FIG. 2). Controller 106 normally controls the overall operation of the wireless communications device 102, whereas signal processing operations associated with communications functions are typically performed in the RF transceiver circuitry 108. Controller 106 interfaces with the display screen 112 to display received information, stored information, user inputs, and the like. Keyboard/keypad 114, which may be a telephone-type keypad or a full QWERTY keyboard, is normally provided for entering commands and data.

The wireless communications device 102 sends communication signals to and receives communication signals from network 104 over a wireless link via antenna 110. RF transceiver circuitry 108 performs functions similar to those of station 118 and Base Station Controller (BSC) 120, including, for example, modulation and demodulation, encoding and decoding, and encryption and decryption. It will be apparent to those skilled in the art that the RF transceiver circuitry 108 will be adapted to the particular wireless network or networks in which the wireless communications device is intended to operate.

The wireless communications device 102 includes a battery interface 134 for receiving one or more rechargeable batteries 132. Battery 132 provides electrical power to electrical circuitry in the device 102, and battery interface 134 provides for a mechanical and electrical connection for battery 132. Battery interface 134 is couple to a regulator 136 which regulates power to the device. When the wireless device 102 is fully operationally, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless communications device 102 operates using a Subscriber Identity Module (SIM) 140 which is connected to or inserted in the wireless communications device 102 at a SIM interface 142. SIM 140 is one type of a conventional "smart card" used to identify an end user (or subscriber) of wireless device 102 and to personalize the device, among other things. Without SIM 140, the wireless communications device 102 is not fully operational for communication through wireless network 104. By inserting the SIM card 140 into the wireless communications device 102, an end user can have access to any and all of his subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical wireless device. SIM 140 may store additional user information for the wireless device as well, including datebook (calendar) information and recent call information.

The wireless communications device 102 may consist of a single unit, such as a data communication device, a cellular telephone, a Global Positioning System (GPS) unit, a multiple-function communication device with data and voice communication capabilities, a wireless-enabled personal digital assistant (PDA), or a wireless-enabled laptop computer. Alternatively, the wireless communications device 102 may be a multiple-module unit comprising a plurality of separate components, including but in no way limited to a computer or other device connected to a wireless modem. In particular, for example, in the block diagram of FIG. 1, RF circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU.

The wireless communications device 102 communicates in and through a wireless communication network 104. The wireless communication network may be a cellular telecommunications network. In the example presented in FIG. 1, wireless network 104 is configured in accordance with Global Systems for Mobile communications (GSM) and General Packet Radio Service (GPRS) technologies. Although wireless communication network 104 is described herein as a GSM/GPRS-type network, any suitable network technologies may be utilized such as Code Division Multiple Access (CDMA), Wideband CDMA (WCDMA), whether 2G, 3G, or Universal Mobile Telecommunication System (UMTS) based technologies. In this example, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is, in turn, coupled to a public or private data network 130 (such as the Internet). HLR 132 is coupled to MSC 122, SGSN 126 and GGSN 128.

Tower station 118 is a fixed transceiver station. Tower station 118 and BSC 120 may be referred to as transceiver equipment. The transceiver equipment provides wireless network coverage for a particular coverage area commonly referred to as a "cell". The transceiver equipment transmits communication signals to and receives communication signals from wireless communications devices 102 within its cell via station 118. The transceiver equipment normally performs such functions as modulation and possibly encoding and/or encryption of signals to be transmitted to the wireless communications device in accordance with particular, usually predetermined, communication protocols and parameters. The transceiver equipment similar demodulates and possibly decodes and decrypts, if necessary, any communication signals received from the wireless communications device 102 transmitting within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless communications device 102. An RF channel is a limited resource that must be conserved, typically due limits in overall bandwidth and a limited battery power of the wireless device 102. Those skilled in the art will appreciate that a wireless network in actual practice may include hundreds of cells, each served by a station 118, depending upon desired overall expanse of network coverage. All pertinent components may be connected by multiple switches and routers (not shown), controlled by multiple network controllers.

For all wireless communications devices 102 registered with a network operator, permanent data (such as the user profile associated with each device) as well as temporary data (such as the current location of the device) are stored in the HLR 132. In case of a voice call to the wireless device 102, the HLR 132 is queried to determine the current location of the device 102. A Visitor Location Register (VLR) of MSC 122 is responsible for a group of location areas and stores the data of those wireless devices that are currently in its area of responsibility. This includes parts of the permanent data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of wireless devices 102. SGSN 126 also performs security functions and access control. Gateway GPRS Support Node (GGSN) 128 provides internetworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by the transceiver equipment instructing the wireless device to select a particular cell. The wireless device 102 informs wireless network 104 when it reselects another cell or group of cells, known as a routing area.

In order to access GPRS services, the wireless device 102 first makes its presence known to wireless network 104 by performing what is known as a GPRS "attach". This operation establishes a logical link between the wireless device 102 and SGSN 126 and makes the wireless device 102 available to receive, for example, pages via SGSN, notifications of incoming GPRS data, or SMS messages over GPRS. In order to send and receive GPRS data, the wireless device 102 assists in activating the packet data address that it wants to use. This operation makes the wireless device 102 known to GGSN 128; internetworking with external data networks can thereafter commence. User data may be transferred transparently between the wireless device 102 and the external data networks using, for example, encapsulation and tunnelling. Data packets are equipped with GPRS-specific protocol information and transferred between wireless device 102 and GGSN 128.

Those skilled in the art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
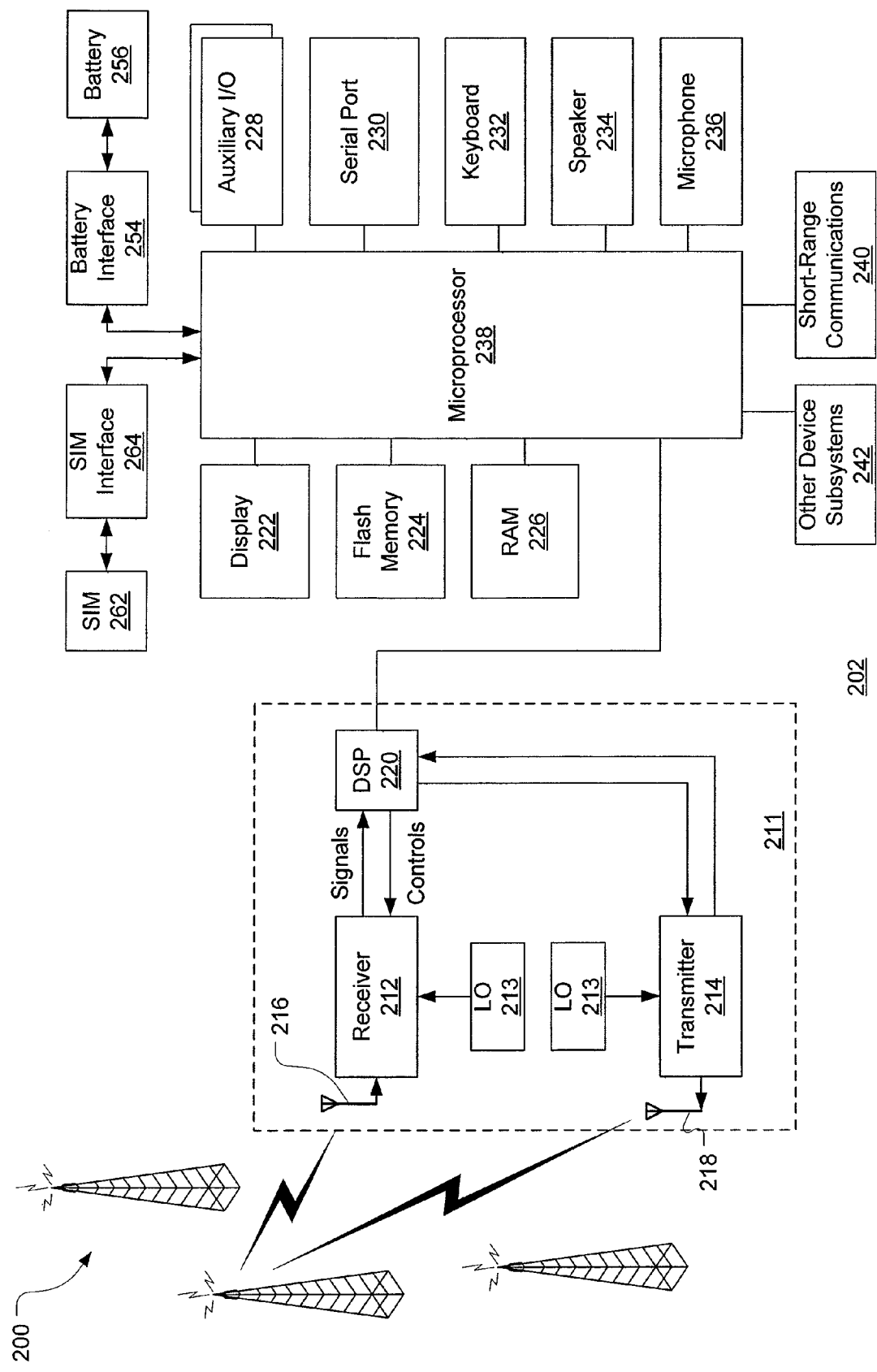
FIG. 2 is a more detailed block diagram of a wireless communications device.

FIG. 2 is a detailed block diagram of a preferred wireless communications device 202. The wireless device 202 is preferably a two-way communication device having at least voice and advanced data communication capabilities, including the capability to communicate with other computer systems. Depending on the functionality provided by the wireless device 202, it may be referred to as a data messaging device, a two-way pager, a cellular telephone with data message capabilities, a wireless Internet appliance, or a data communications device (with or without telephony capabilities). The wireless device 202 may communicate with any one of a plurality of fixed transceiver stations 200 within its geographic coverage area.

The wireless communications device 202 will normally incorporate a communication subsystem 211, which includes a receiver 212, a transmitter 214, and associated components, such as one or more (preferably embedded or internal) antenna elements 216 and 218, local oscillators (LO's) 213, and a processing module such as a digital signal processor (DSP) 220. Communication subsystem 211 is analogous to RF transceiver circuitry 108 and antenna 110 shown in FIG. 1. As will be apparent to those skilled in the field of communications, the particular design of communication subsystem 211 depends on the communication network in which the wireless device 202 is intended to operate.

The wireless device 202 may send and receive communication signals over the network after required network registration or activation procedures have been completed. Signals received by antenna 216 through the network are input to receiver 212, which may perform common receiver functions as signal amplification, frequency down conversion, filtering, channel selection, and the like, and, as shown in the example of FIG. 2, analog-to-digital (A/D) conversion. A/D conversion of a received signal allows more complex communication functions such as demodulation and decoding to performed in the DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in the DSP 220.

Network access is associated with a subscriber or user of the wireless device 202, and therefore the wireless device requires a Subscriber Identity Module or SIM card 262 to be inserted in a SIM interface 264 in order to operate in the network. SIM 262 includes those features described in relation to FIG. 1. Wireless device 202 is a battery-powered device so it also includes a battery interface 254 for receiving one or more rechargeable batteries 256. Such a battery 256 provides electrical power to most if not all electrical circuitry in the device 102, and battery interface provides for a mechanical and electrical connection for it. The battery interface 254 is coupled to a regulator (not shown) which provides a regulated voltage V to all of the circuitry.

Wireless communications device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or onboard functions. Notably, some subsystems, such as keyboard 232 and display 222, for example, may be used for both communication-related functions, such as entering a text message for transmission over a communication network, and device-resident functions such as a calculator or task list. Operating system software used by the microprocessor 238 is preferably stored in a persistent (non-volatile) store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the wireless device 202. A predetermined set of applications which control basic device operations, including at least data and voice communication applications, will normally be installed on the device 202 during its manufacture. For example, the device may be pre-loaded with a personal information manager (PIM) having the ability to organize and manage data items relating to the user's profile, such as e-mail, calendar events, voice mails, appointments, and task items. Naturally, one or more memory stores are available on the device 202 and SIM 256 to facilitate storage of PIM data items and other information.

The PIM application preferably has the ability to send and receive data items via the wireless network. PIM data items may be seamlessly integrated, synchronized, and updated via the wireless network, with the wireless device user's corresponding data items stored and/or associated with a host computer system thereby creating a mirrored host computer on the wireless device 202 with respect to such items. This is especially advantageous where the host computer system is the wireless device user's office computer system. Additional applications may also be loaded into the memory store(s) of the wireless communications device 202 through the wireless network, the auxiliary I/O subsystem 228, the serial port 230, short-range communications subsystem 240, or any other suitable subsystem 242, and installed by a user in RAM 226 or preferably a non-volatile store (not shown) for execution by the microprocessor 238. Such flexibility in application installation increases the functionality of the wireless device 202 and may provide enhanced onboard functions, communication-related functions or both. For example, secure communication applications may enable electronic commerce functions and other such financial transactions to be performed using the wireless device 202.

In a data communication mode, a received signal such as a text message, an e-mail message, or a web page download will be processed by communication subsystem 211 and input to microprocessor 238. Microprocessor 238 will preferably further process the signal for output to display 222 or alternatively to auxiliary I/O device 228. A user of the wireless device 202 may also compose data items, such as email messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of the wireless communications device 202 is substantially similar, except that the received signals would be output to speaker 234 and signals for transmission would be generated by microphone 236. Alternative voice or audio I/O subsystems, such as a voice message recording subsystem, may also be implemented on the wireless device 202. Although voice or audio signal output is preferably accomplished primarily through speaker 234, display 222 may also be used to provide an indication of the identity of the calling party, duration on a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to the wireless device 202 other than through the wireless network. The alternate download path may, for example, be used to load an encryption key onto the wireless device 202 through a direct and thus reliable and trusted connection to thereby provide secure device communications.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a trademark of Bluetooth SIG, Inc.

Figure 3A:
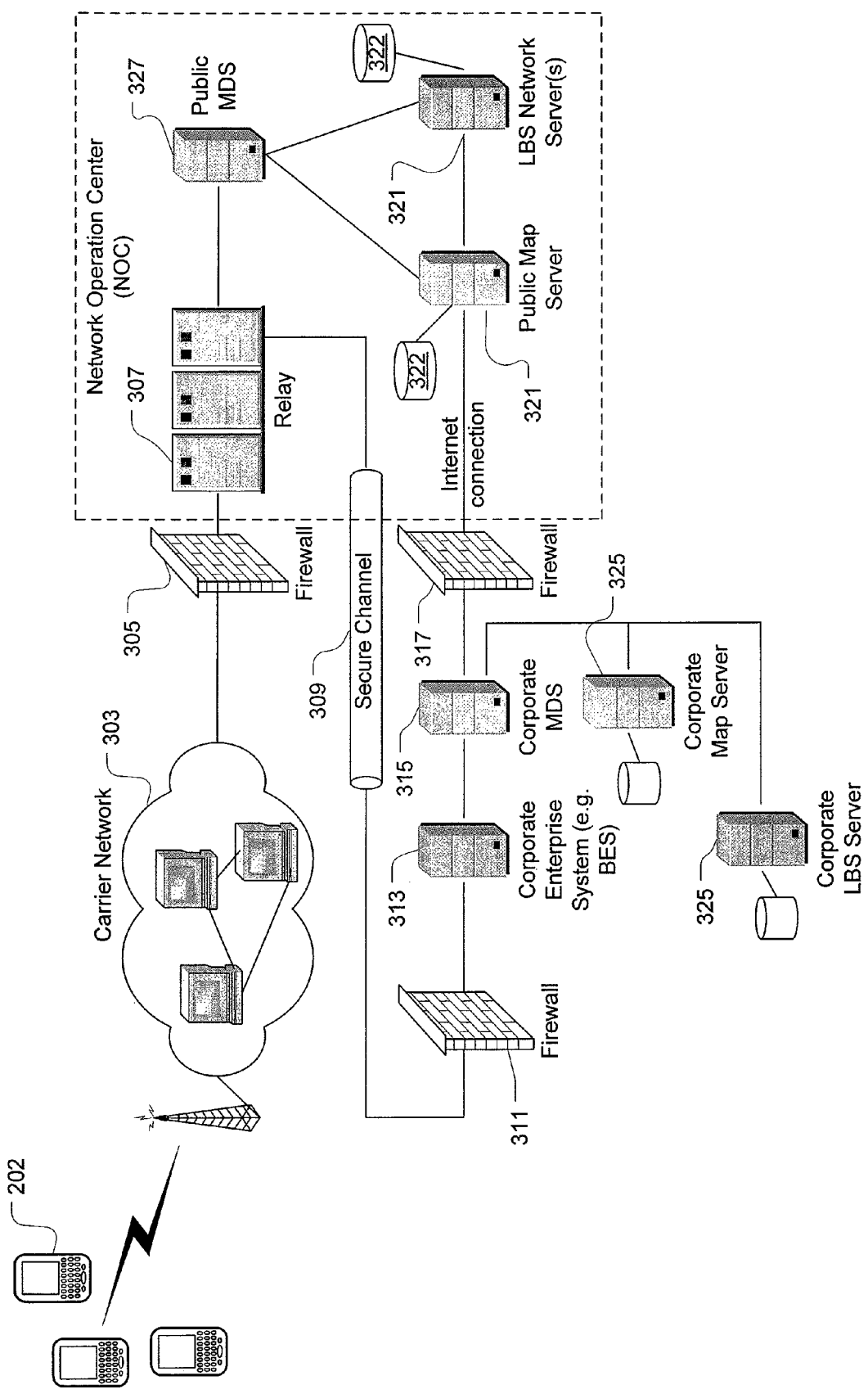
FIG. 3A is a system diagram of network components which provide mapping functionality in the wireless communications devices of FIG. 1 and FIG. 2.

FIG. 3A is a system diagram of network components which provide mapping functionality in the wireless communication devices of FIGS. 1 and 2. To achieve this, a mapping application is also provided in memory of the wireless communications device for rendering visual maps in its display. Wireless communications devices 202 are connected over a mobile carrier network 303 for communication through a firewall 305 to a relay 307. A request for map data from any one of the wireless communications devices 202 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 202. Alternatively, where no corporate servers are provided, the request from the wireless device 202 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

A Maplet data structure is provided that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artefact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the carious points within the DEntry are separated into different parts representing various portions of the artefact or map feature (e.g. portions of the street). A wireless device may issue a request for the map server to download only those DEntries that are included within a specified area or bounding box representing an area of interest that can be represented by, for example, a pair of bottom left, top right coordinates.

Figure 3B:
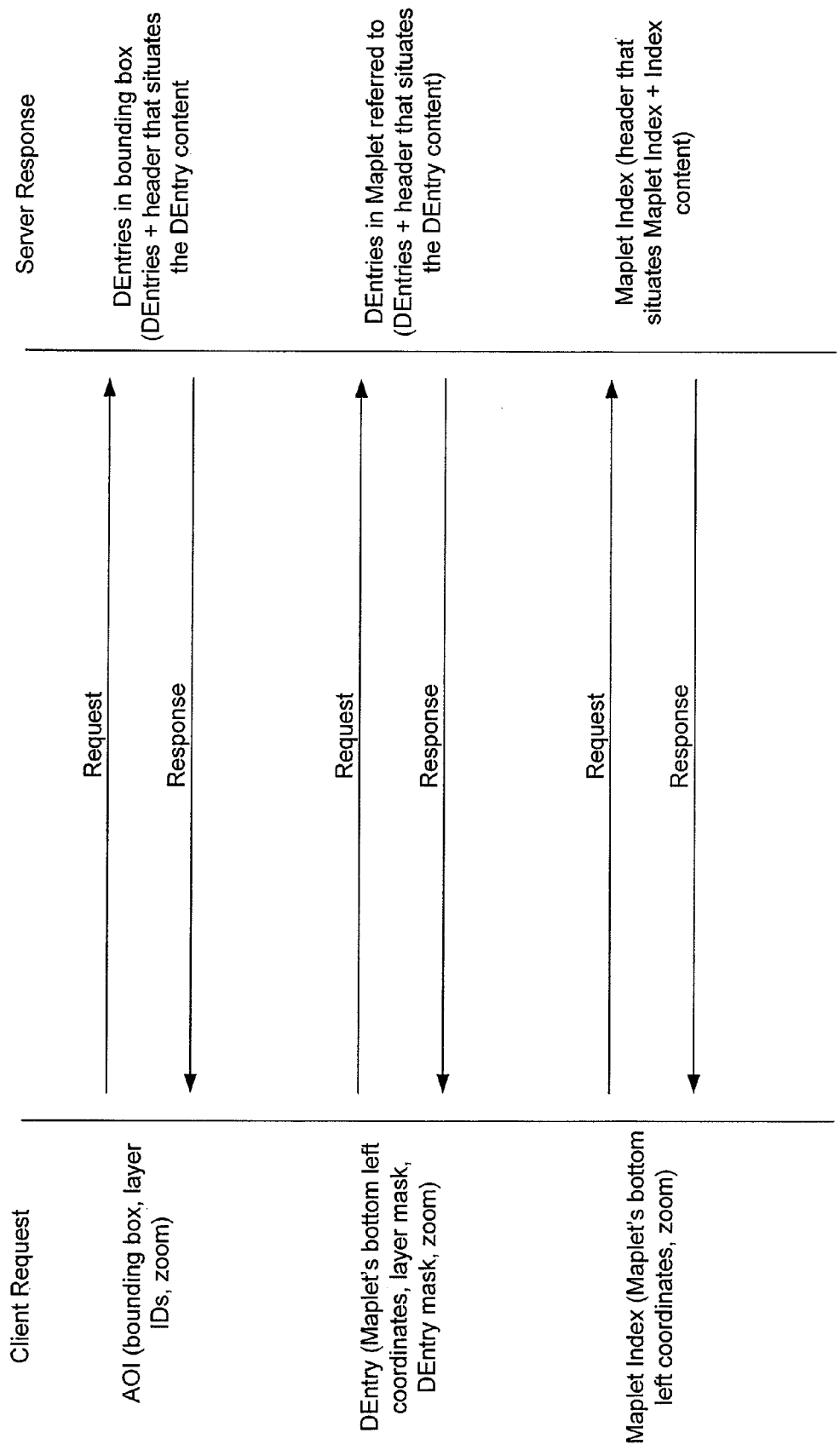
FIG. 3B illustrates a message exchange between a wireless communications device and a map server for downloading map content to the wireless communications device based on the system of FIG. 3A.

As depicted in FIG. 3B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artefacts within the Maplet. As the field of view changes (e.g. for a location-aware device that displays a map while moving), the device (client) software assesses whether or not it needs to download additional data from the server. Thus, if the size attribute or complexity attribute of an artefact that has started to move into the field of view of the device (but is not yet being displayed) is not relevant to the viewer's current context, then the device can choose not to display that portion of the artifact. On the other hand, if the portion of the artefact is appropriate for display, then the device accesses its cache to determine whether the DEntries associated with that portion of the artefact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a $1^{st}$ z-order attribute from public database), adjacent a river (e.g. a $2^{nd}$ z-order attribute from public database), with a superimposed floor plane of the building to show individual offices (e.g. $11^{th}$ z-order attribute from a private database, accessible through a firewall).

Referring back to FIG. 3A, within the network having map server(s) and/or LBS server(s) 321 and database(s) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of courser, be substituted. A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data or DEntry request is a mechanism to bundle together all of the required Dentries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns a Maplet Index that indicates what data the client can specifically request from the server 321, while the AOI request returns any DEntries within the area of interest for the specified Layers (if they exist). In the example requests shown on FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet #0 Offset (4 bytes) | Maplet #0 Length (4 bytes) |
| 0x008 | Maplet #1 Offset | Maplet #1 Length |
| 0x010 | Maplet #2 Offset | Maplet #2 Length |
| ... | ... | ... |
| 0xC78 | Maplet #399 Offset | Maplet #399 Length |
| 0xC80 | Beginning of Maplet #0 | |
| 0xC80 + Size of Maplet #0 | Beginning of Maplet #1 | |
| 0xC80 + Size of Maplet #0 + #1 | Beginning of Maplet #2 | |
| ... | ... | |
| 0xC80 + Σ of Size of Maplets (#0:#398) | Beginning of Maplet #399 | |

In Table B, the offset of Maplet #0 is 0x0000_0000 since, in this particular example, the data structure is based on the assumption that the base address for the actual Maplet data is 0x0000_0C80. Therefore the absolute address for Maplet #0 data is: Maplet #0 Address=Base Address (0x0000_0C80)+ Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index #0 Offset | Maplet Index #0 Length |
| 0x008 | Maplet Index #1 Offset | Maplet Index #1 Length |
| 0x010 | Maplet Index #2 Offset | Maplet Index #2 Length |
| ... | ... | ... |

TABLE C-continued

| Address Offset | Offset (4 bytes) | Length (4 bytes) |
| --- | --- | --- |
| 0xC78 | Maplet Index #399 Offset | Maplet Index #399 Length |
| 0xC80 | | Beginning of Maplet Index #0 |
| 0xC80 + Size of Maplet Index #0 | | Beginning of Maplet Index #1 |
| 0xC80 + Size of Maplet Index #0 + #1 | | Beginning of Maplet Index #2 |
| ... | | ... |
| 0xC80 + Σ of Size of Maplet Indices (#0:#399) | | Beginning of Maplet Index #399 |

In Table C, the offset of Maplet Index #0 is 0x0000_0000 since, according to an exemplary embodiment the data structure is based on the assumption that the base address for the actual Maplet index data is 0x0000_0C80. Therefore, the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
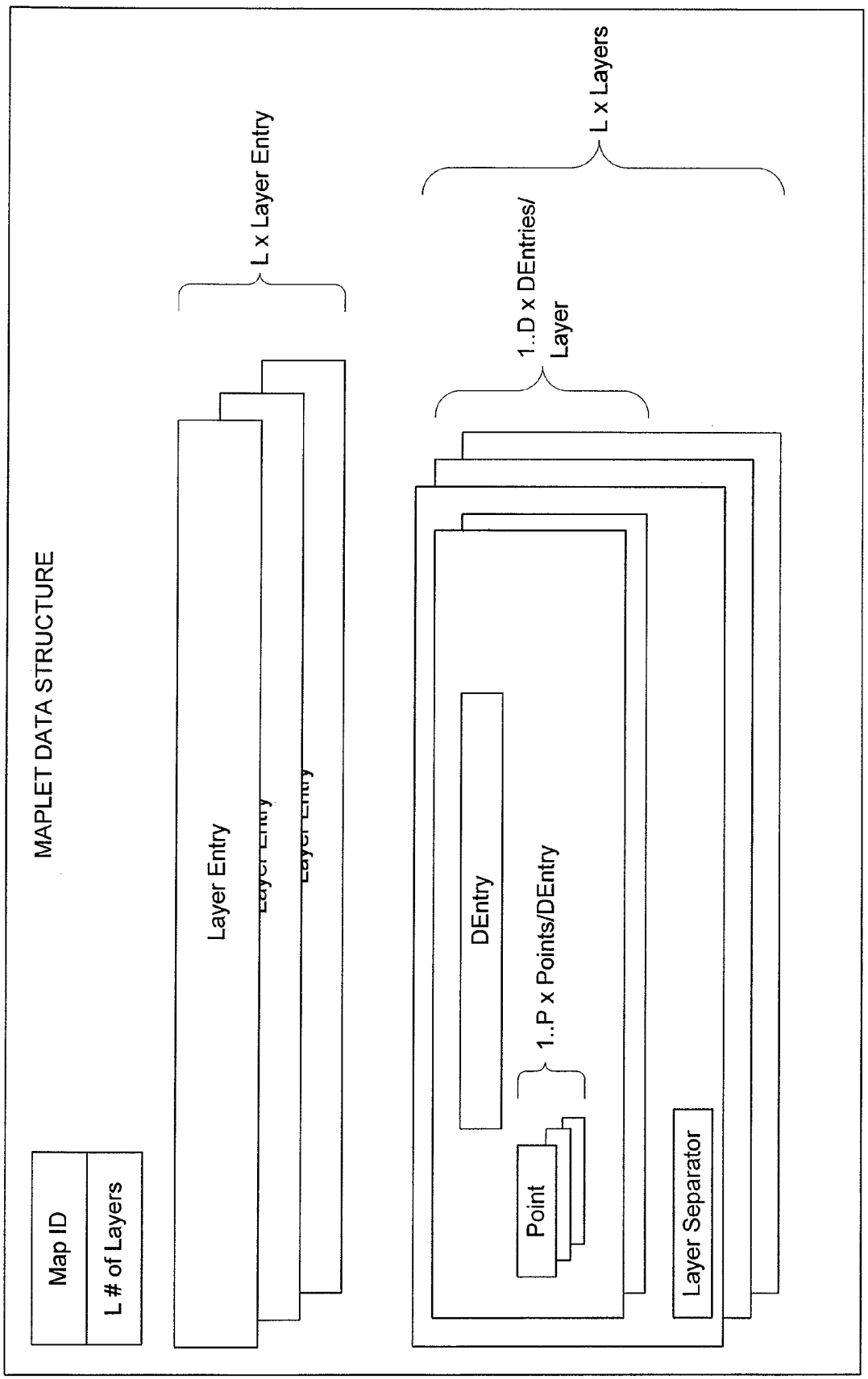
FIG. 3C is a diagram showing a preferred Maplet data structure.

FIG. 3C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. The above forms a Maplet Index. For a complete Maplet, each DEntry contains a set of data Points (referred to herein as opoints) or Labels). It will be noted that Layers can have multiple DEntries and the complete list of DEntries and Points are grouped by Layer and separated by a Layer Separator (e.g. hex value 0xEEEEEEEE). In this example, each Layer Entry is 20 bytes long, and a DEntry is 12 bytes long. However, the number of Layers, number of DEntries per Layer and the number of Points per DEntry depends on the map data and is generally variable.

Table D provides a high "byte-level" description of a Maplet for this example.

TABLE D

| Data | | Quantity | Total # of Bytes |
| --- | --- | --- | --- |
| Map ID | | 1 | 4 bytes |
| # of Layers | | 1 | 4 bytes |
| Layer Entries | | # of Layers | 20 bytes × (# of Layers) |
| DEntry of a Layer | x (# of DEntries in a Layer) | # of Layers | 12 bytes × (Σ of the # of DEntries in each Layer) + |
| Points for DEntry of a Layer | | | 4 bytes × (Σ of the # of Points in each DEntry in each Layer) + |
| Layer Separator | | | 4 bytes × (# of Layers) |

By way of a further example, the wireless network 200 depicted in FIG. 4 can include an applications gateway (AG) 350 for optimizing data flow for onboard applications such as a mapping application 500 stored in memory (e.g. stored in a flash memory 224) and executable by the microprocessor 238 of the wireless device 202.

As shown in FIG. 4, the wireless network 200 hosts a plurality of handheld wireless communications devices 202 (such as the BlackBerry™ by Research in Motion Limited) having voice and data capabilities (for both e-mail and web browsing) as well as a full QWERTY keyboard. These wireless communications devices 202 can access Web-based map data on public map servers 400 hosted on the Internet or other data network 130 via the applications gateway (AG) 350 which mediates and optimizes data flow between the wireless network 200 and the data network by performing various mappings, compressions and optimizations on the data.

The map server extracts generic map content from a Geographical Information Systems (GIS) map database (e.g. Navtech®, TelAtlas®, etc.) at a specified level of resolution (zoom level). Custom graphics associated with the query, such as highlighted route, pushpin for current position or street address, etc. are post-processed and merged by the server with the generic map content. Relevant screen graphics are then labelled, and the merged map graphic is compressed and delivered to the device for display.

In operation, a user of the wireless communications device 202 uses an input device such as keyboard 232 and/or thumbwheel/trackball 233 to cause the microprocessor 238 to open the map application 500 stored in the memory 224. Using the keyboard 232 and thumbwheel/trackball 233, the user specifies a map location on the map application 500. In response to this request/command, the microprocessor 238 instructs the RF transceiver circuitry 211 to transmit the request over the air through the wireless network 104. The request is processed by the AG 350 and forwarded into the data network (Internet) using standard packet-forwarding protocols to one or more of the public and/or private map servers 400, 410. Accessing a private map server 410 behind a corporate firewall 420 was described above with reference to FIG. 3A. Map data downloaded from these one or more map servers 400, 410 is then forwarded in data packets through the data network and mapped/optimized by the AG 350 for wireless transmission through the wireless network 104 to the wireless communications device 202 that originally sent the request.

The downloaded map data (including any available label data) can be cached locally in RAM 226, and displayed on the display 222 or graphical user interface (GUI) of the device after the map application 500 has verified that any labels to be rendered on the map will not be rendered such that they exceed the predetermined angular threshold, as will elaborated below. If any labels exceeds this threshold, they are repositioned and tested again for compliance with the threshold (again, as will be described below). If a further request is made by the user (or if the user wants a change in the field of view by zooming or panning), the device will check whether the data required can be obtained from the local cache (RAM 226). If not, the device issues a new request to the one or more map servers 400, 410 in the same manner as described above.

As described earlier, map data can optionally be downloaded first as a Maplet Index enabling the user to then choose which DEntries listed in the Index to download in full. Furthermore, as described earlier, the map application can include user-configurable context filtering that enables the user to filter out unwanted map features or artifacts by not downloading specific DEntries corresponding to those unwanted map features or artifacts.

As a variant, the wireless communications device can optionally include a Global Positioning System (GPS) receiver ("GPS chip") 550 for providing location-based services (LBS) to the user in addition to map content. Embedding a GPS chip 550 capable of receiving and processing signals from GPS satellites enable the GPS chip to generate latitude and longitude coordinates, thus making the device "location aware". To obtain local-based services, the map application within the wireless communications device sends a request to the map server for information relating to a city, restaurant, street address, route, etc. If the device is "location aware", the request would include the current location of the device.

In lieu of, or in addition to, GPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell.

Figure 5:
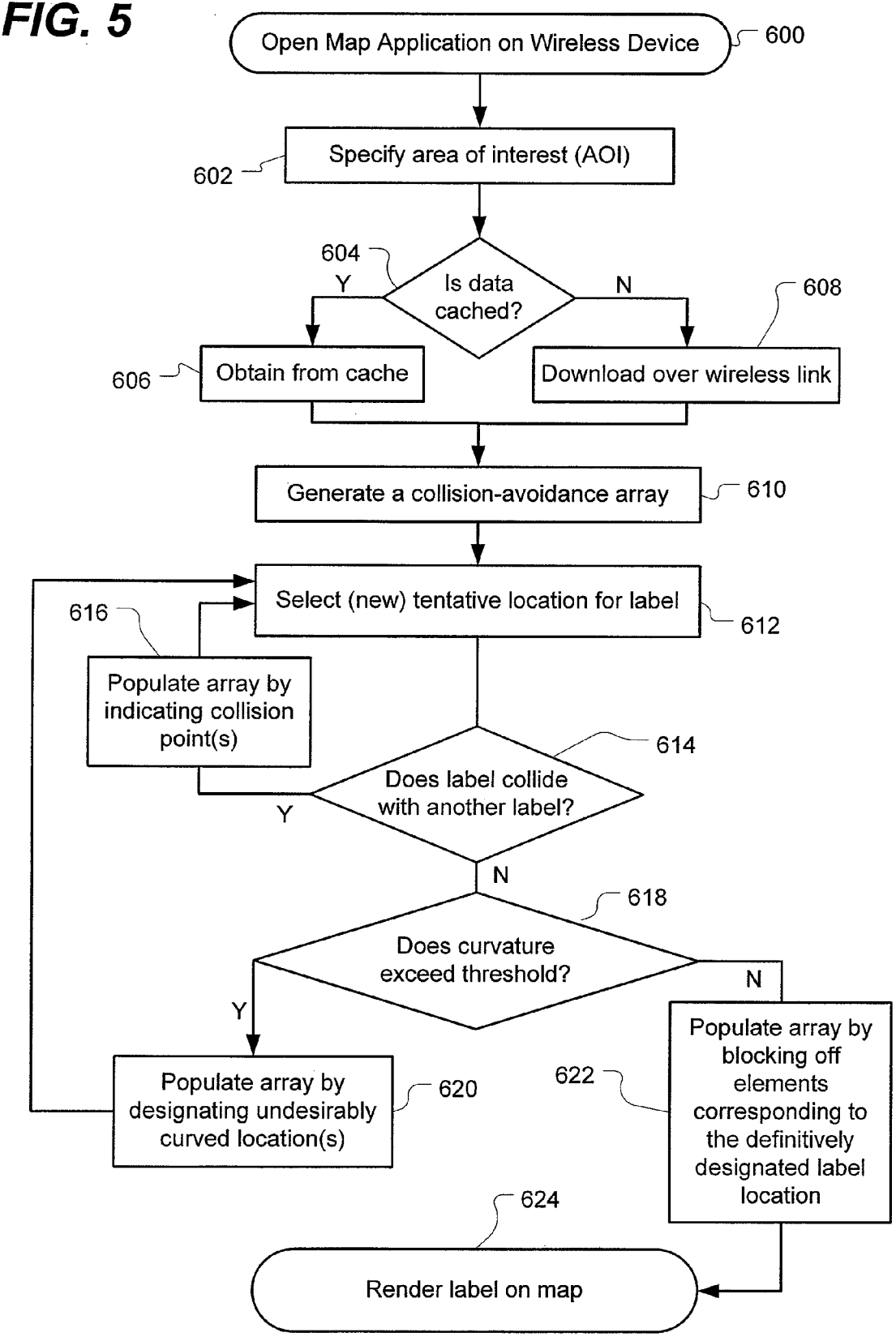
FIG. 5 is a flowchart presenting steps of a method of displaying a map on a wireless device by proscribing label locations where the curvature of the label, or its associated path segment, exceeds a predetermine threshold.

Operation of the systems described above will now be described with reference to the method steps depicted in the flowchart of FIG. 5. As depicted in FIG. 5, this method of displaying a map on a wireless communications device includes initial steps of opening the map application on the device (step 600) and specifying an area of interest (AOI) using the map application (step 602), e.g. specifying a street address, coordinates of latitude or longitude, or clicking on a location on a world map, etc. In response to the specifying of an AOI, map data is then obtained (step 604) for rendering the map to be displayed on the wireless communications device. For the purposes of this specification, "obtaining map data" means receiving or downloading the map data over the air, i.e. over a wireless link, retrieving the map data from a local cache, or downloading the map data over a wired connection, or any combination thereof. In other words, as depicted in FIG. 5, obtaining map data includes steps of determining whether the data is already cached locally (step 604). If the data is locally cached, the map data is retrieved from the cache (step 606). Otherwise, if not all of the map data is cached, then the map data is downloaded over the air (step 608).

As depicted in FIG. 5, once the map data is obtained, the device (in one implementation) generates a collision-avoidance array (step 610) representative of the map to be rendered (the onscreen bounding box) for the purposes of testing potential locations for map labels and optionally also for the purposes of ascertaining whether a given label would collide with any other labels for which map positions have already been designated. As will become apparent from the following description, the step of generating the collision-avoidance array is optional. In order words, the present technology can be implemented without using a collision-avoidance array.

Once the collision-avoidance array is generated (step 610), the map application selects a tentative location for a label to be rendered onscreen (step 612). This tentative label position is compared (step 614) with pre-existing (or higher-priority) label positions, in a virtual rendering process, to determine whether the tentative label position interferes with any of the pre-existing labels. If so, the collision point is indicated in the collision-avoidance array (step 616) for future reference, and a new tentative label position is checked until a non-interfering position is found for the map label (or until all potential positions for that label are exhausted, at which point the map application concludes that this particular label cannot be rendered onscreen given the available screen space).

It should be understood that the step of checking for collisions with other labels (step 614) and the consequent step of populating the collision-avoidance array (step 616) are optional. These steps 614, 616 are optional because they are independent of the process of checking for undesirably curved locations, and thus the latter can be performed without the former, or vice versa. Preferably, though, both checks are performed before actually rendering the labels onscreen.

Once this optional collision check has been performed, the map application compares the curvature of the label, or of a path segment associated with the label, against a predetermined threshold (step 618). If the curvature exceeds the predetermined threshold, the array is populated by designating the undesirably curved location as effectively being a "collision" (step 620). A new label location is then tested, as depicted in FIG. 5. If the curvature does not exceed the predetermined threshold, then the label location is considered acceptable and thus can be actually rendered (as opposed to virtually rendered by testing it in the collision-avoidance array). When the provisional or tentative label position becomes definite, the collision-avoidance array is populated (step 622) by designating elements of the array, representing the definitive label position, as being reserved (i.e. "blocked off"). Finally, at step 624, after updating the collision-avoidance array at step 622, the label can be rendered on the map. Usually, the rendering of labels occurs only once all definitive label positions are determined, although this could be done in a piecemeal fashion as each definitive label position is determined.

For the purposes of this specification, "label" includes not only all conventional forms of labels, such as city names, street names, etc, but also any symbols or icons, such as highway number icons, or symbols or icons used to denote airports, tourist information kiosks, campgrounds, ferry crossings, etc. on large scale (regional) maps or restaurants, hotels, bus stations, etc. on city maps.

For the purposes of this specification, "map feature" means a path, road, street, highway or other route and also includes features such as a river or any other geographical feature that has a narrow, curved shape that is difficult to label aesthetically.

Figure 6A:
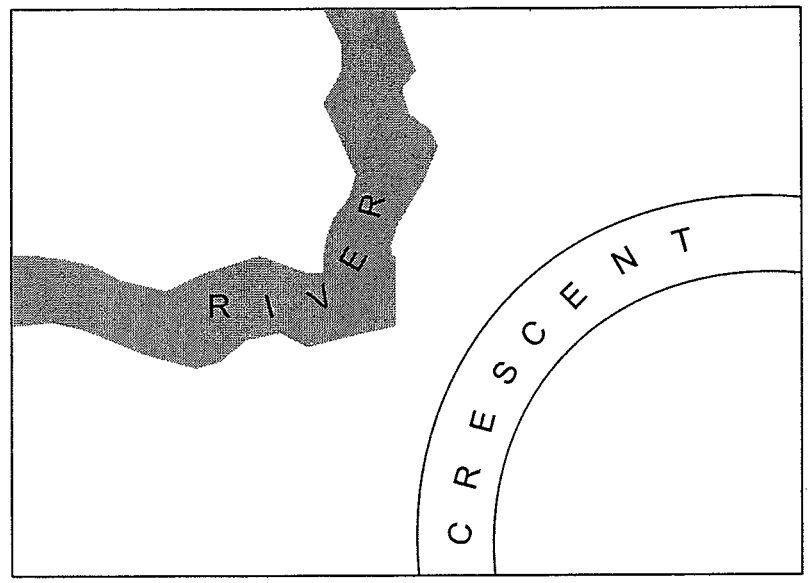
FIG. 6A is an example of an onscreen map on which labels are rendered both on a curved path and on a curved non-path map feature (e.g. a river)
Figure 6B:
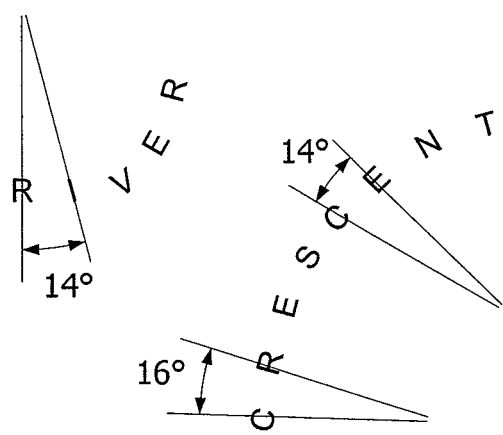
FIG. 6B depicts a process of determining the change in angular orientation for each successive character of the label.

FIG. 6A presents an example of an onscreen map on which labels are rendered both on a curved path and on a curved non-path map feature (e.g. a river). FIG. 6B depicts a process of determining the change in angular orientation for each successive character of the labels shown in FIG. 6A. In one implementation, this can be done by determining the angular orientation of each successive character in the label relative to the preceding character and then comparing this change in angular orientation to a predetermined angular threshold. As shown in the example presented in FIG. 6A, the change in orientation of the I in "River" relative to the R in "River" is 14 degrees. Similarly, the change in orientation of the R in "Crescent" relative to the C in "Crescent" is 16 degrees. In this implementation, the change in orientation for each successive letter or character in the label is checked to make sure that no part of the label is rotated too drastically. Variations on the foregoing analysis can be employed in lieu of the technique described above, or in addition to it, as a further check. For example, the change in orientation between the first character and the last character can be compared against a predetermined threshold. As another example, the change in orientation of the middle character relative to the first and last characters can be compared against predetermined thresholds. Although more complex techniques can be envisaged, computational efficiency should not be sacrificed so that real-time rendering of aesthetically-placed labels can be achieved on the wireless device.

Figure 7A:
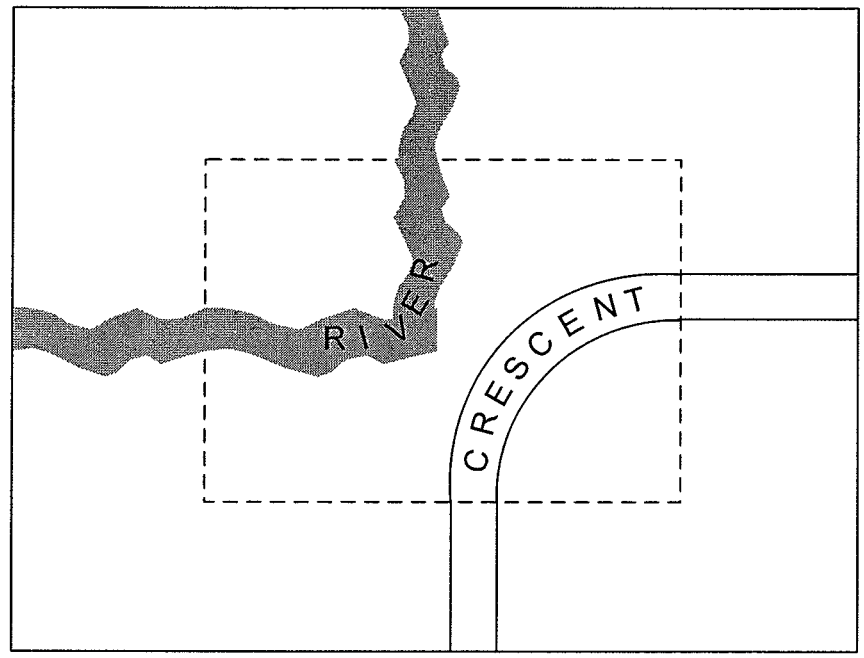
FIG. 7A shows the map of FIG. 6A after it has been zoomed out, depicting the effect of the zoom factor (or magnification factor) on the curvature of labels.
Figure 7B:
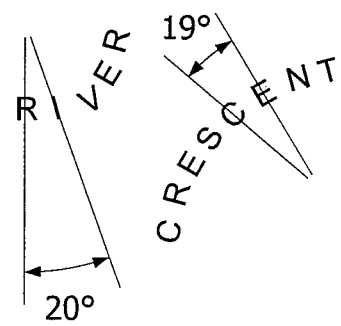
FIG. 7B depicts the change in angular orientation between successive characters for the map of FIG. 7A, thus demonstrating how the change in angular orientation increases when the map is zoomed out.

FIG. 7A shows the map of FIG. 6A after it has been zoomed out, depicting the effect of the zoom level (or magnification factor) on the curvature of the labels. FIG. 7B depicts the change in angular orientation between successive characters for the map of FIG. 7A, thus demonstrating how the change in angular orientation increases when the map is zoomed out. As shown (for illustrative purposes only), the zooming out of the map causes the angular differential between the R and the I in "River" to increase from 14 degrees to 20 degrees and the angular differential between the C and the E in "Crescent" to increase from 14 degrees to 19 degrees. In either case, the zooming out might cause the angular differential to exceed the predetermined threshold. To account for this effect, it is preferable that the angular threshold be a function of the zoom level (or magnification factor).

Figure 8A:
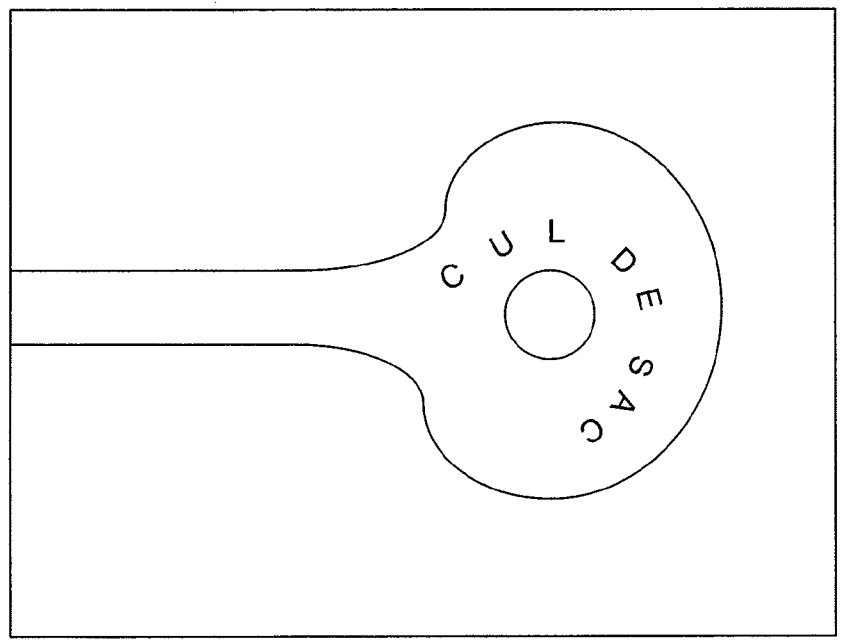
FIG. 8A depicts a label on a cul-de-sac at a relatively high level of magnification, thus providing sufficient space for the map label.
Figure 8B:
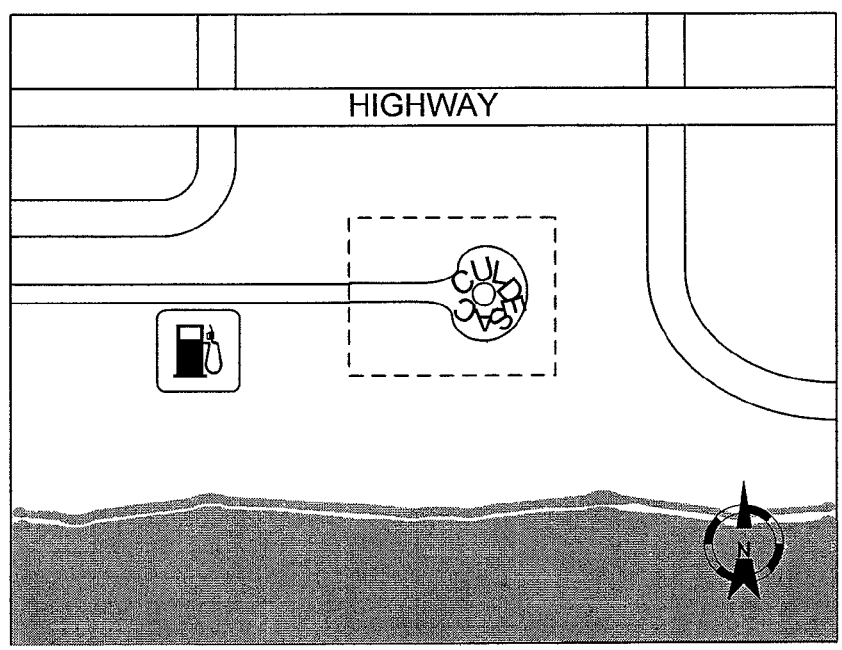
FIG. 8B shows the map of FIG. 8A after it has been zoomed out, demonstrating how the map label "cul de sac" is no longer easily readable.

FIG. 8A depicts a label on a cul-de-sac at a relatively high level of magnification. As shown, there is sufficient space for the map label "cul de sac". However, as shown in FIG. 8B, after the map of FIG. 8A has been zoomed out, almost no space is available for rendering the label on the path. Even if the path label "cul de sac" is rendered on the path, it is no longer easily readable.

Figure 9A:
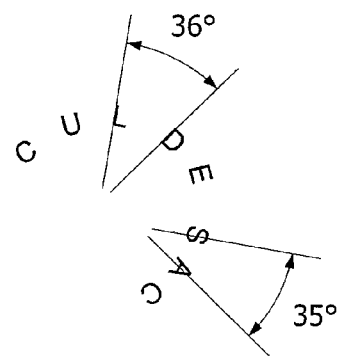
FIG. 9A shows a character-by-character analysis of the map label "cul de sac" at the high level of magnification used to generate the map of FIG. 8A.
Figure 9B:
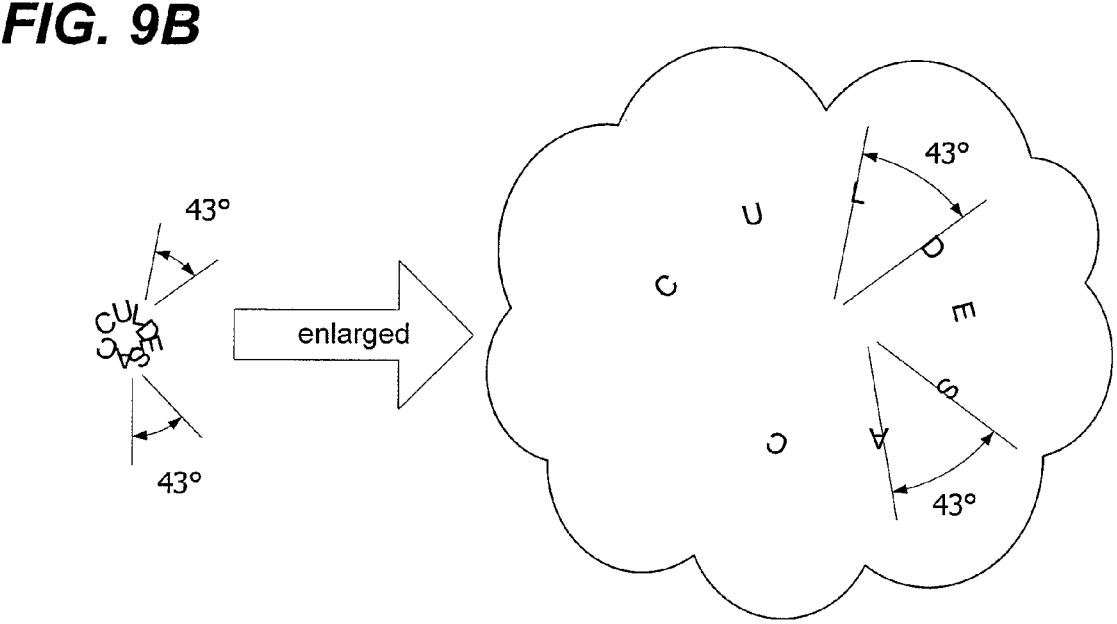
FIG. 9B shows a corresponding character-by-character analysis of the map label "cul de sac" at the low level of magnification used to generate the map of FIG. 8B, showing that the change in angular orientation is greater than the change in angular orientation shown in FIG. 9A.

FIG. 9A shows a character-by-character analysis of the map label "cul de sac" at the high level of magnification used to generate the map of FIG. 8A. Angular differentials of 36 and 35 degrees, respectively, are determined for the L-to-D and S-to-A neighbour pairs in "cul de sac". When zoomed out to the map of FIG. 8B, this angular differential worsens as presented in FIG. 9B, which shows a corresponding character-by-character analysis of the map label "cul de sac" at the low level of magnification used to generate the map of FIG. 8B (both at its "true screen size" and after enlargement). The change in angular orientation is now greater than the change in angular orientation shown in FIG. 9A. As shown, the angular differential of the L-D neighbour pairing increases from 36 to 43 degrees while the S-A pairing increases from 35 to 43 degrees. For the sake of illustration, let us assume that the predetermined angular threshold is set at 40 degrees. The label "cul de sac" would thus be acceptable at the zoom level of the map presented in FIG. 8A but it would no longer be acceptable at the zoom level of the map presented in FIG. 8B.

Figure 10A:
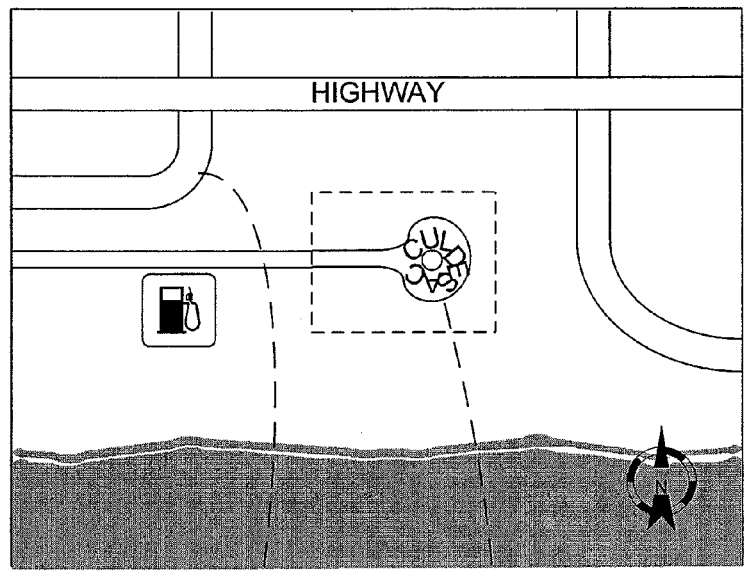
FIGS. 10A and 10B respectively depict an onscreen map and a corresponding collision-avoidance array wherein particular elements of the array have been proscribed as representing points where the curvature exceeds a predetermined threshold.
Figure 10B:
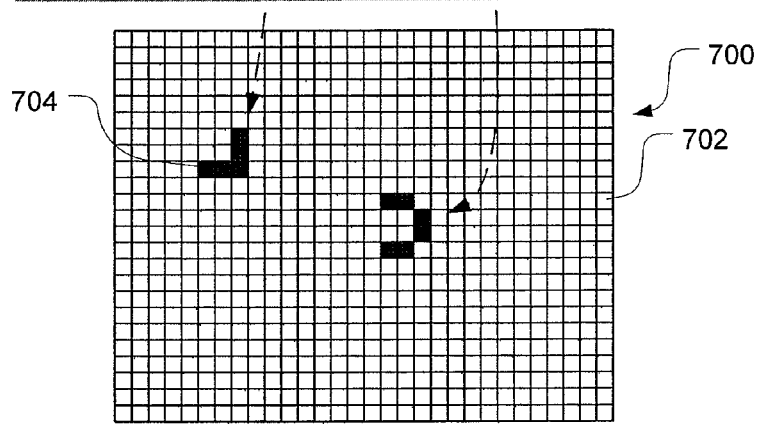

FIGS. 10A and 10B respectively depict an onscreen map and a corresponding collision-avoidance array 700 wherein particular elements of the array have been proscribed as representing points where the curvature exceeds a predetermined threshold. (The map of FIG. 10A is the same map as was presented in FIG. 8B). As shown in FIG. 10B, the collision-avoidance array 700 (or "test array") is a two-dimensional array of elements or pixels 702. The array 700 is a scaled-down proportional representation of the onscreen map. Usually, the collision-avoidance array 700 is generated such that one element or pixel of the array corresponds to a character onscreen. In other words, each onscreen character can be mapped to a single element of the array. Thus, if any onscreen characters have a orientation (e.g. relative to their preceding character) that exceeds the threshold, the corresponding element in the array can be "blocked off" as designating an unacceptable location for that character of the label. Points where the curvature of the label is unacceptably high can be designated "collision points" 704 in the array. The map application will reposition the label to avoid the collision points, i.e. the points where the label curvature would be unacceptably high.

Figure 10C:
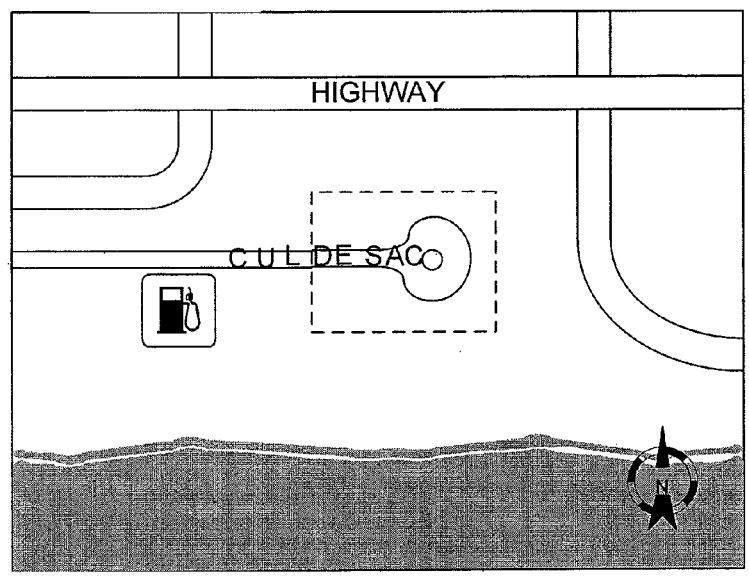
FIG. 10C depicts the map of FIG. 10A after repositioning of the path label "cul de sac" in order to avoid the "collision points" in the array where the curvature has been found to exceed the predetermined threshold.

As was mentioned earlier, the array 700 can also be populated with collision points corresponding to locations onscreen where two labels would potentially overlap. Furthermore, elements of the array corresponding to any pre-existing labels can also be designated as such in order to preclude the map application from assigning a position to a new label that would interfere with any of the pre-existing labels. In summary, then, the array 700 could be used to store label positions for labels whose positions are definite, as well as "collision points", either due to virtual collisions in the array between a new prospective label and a pre-existing label or due to points of excessive curvature where labels cannot be rendered aesthetically. If a first attempt at positioning the label fails because the curvature is excessive, the map application will reposition the label and test a new prospective location for the label. This can be accomplished either (i) by moving the label (i.e. sliding the text-on-path object) beyond the collision point(s) (if less than half of the label could be virtually rendered in the array before the collision) or (ii) by moving the label to a position before the collision by an amount equal to, for example, half a length of the label (if more than half is can be virtually rendered before the collision). FIG. 10C depicts the map of FIG. 10A after repositioning of the path label "cul de sac" in order to avoid the "collision points" in the array where the curvature has been found to exceed the predetermined threshold.

Figure 11A:
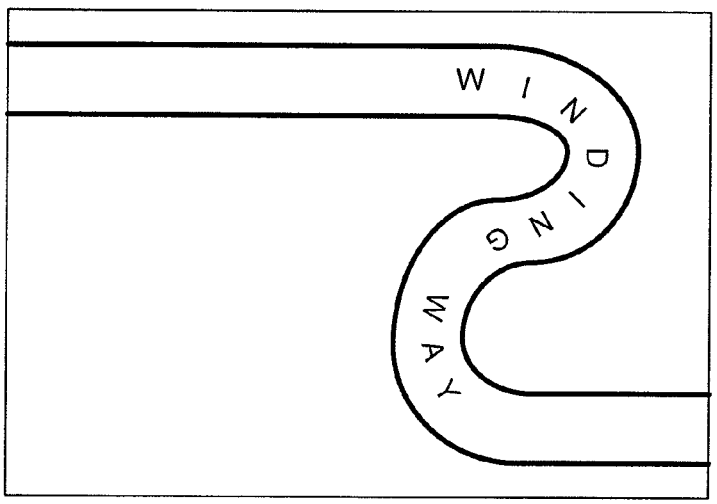
FIG. 11A is a depiction of a map of a curving path upon which a curving path label is rendered.
Figure 11B:
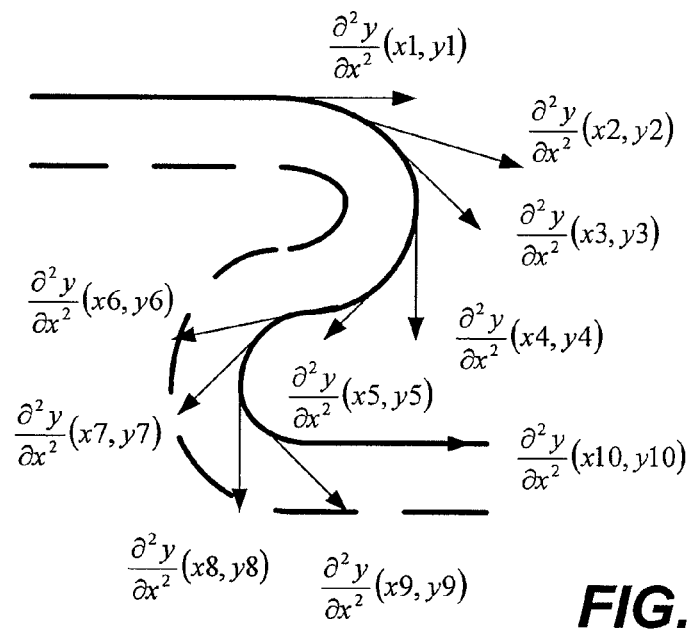
FIG. 11B is a depiction of analysis wherein the rate of change of slope is determined for a portion of the path along which the label is to be rendered.
Figure 11C:
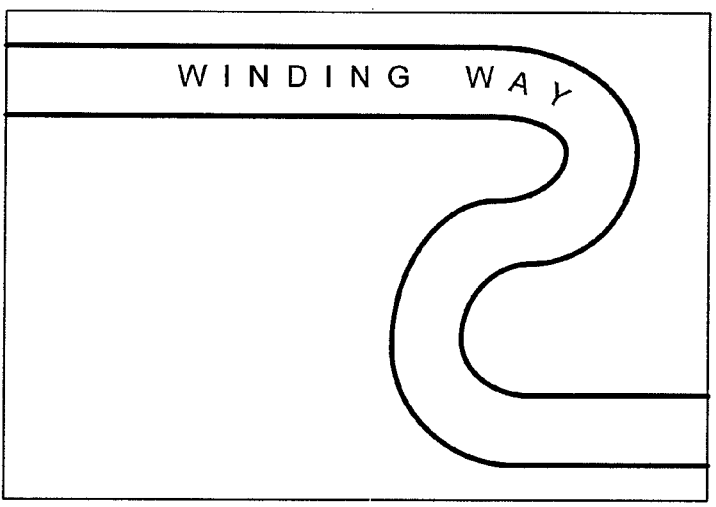
FIG. 11C is a depiction of the map of FIG. 11A after the path label has been repositioned to avoid the zone(s) where the rate of change of slope exceeds a predetermined threshold.

In another implementation, illustrated in FIG. 11A-11C, the determination of whether the label curvature exceeds a predetermined threshold is accomplished by examining the rate of change of slope of the portion of the path segment along which the label is to be rendered. Consider, for example, the depiction of a map in FIG. 11A having a curving path upon which a curving path label (e.g. "Winding Way") is to be rendered. In this example, the portion(s) of the path segment(s) along which the label "Winding Way" is to be rendered are analyzed as shown in FIG. 11B. The rate of change of slope can be determined by selecting a set of test points along the path (represented in FIG. 11B by screen coordinates $\{(x1,y1), (x2,y2), (x3,y3)\ldots(x10,y10)\}$. At each set of screen coordinates, the slope $$\left(\frac{\partial y}{\partial x}\right)$$

is determined, for example by computing the derivative of the vector path segment at the point of interest or by using an approximation of the slope at that point based on $\Delta y/\Delta x$ for an interval about the point in question. The rate of change of slope can then be calculated as $$\frac{\partial^2 y}{\partial x^2}$$

at each of the various sets of screen coordinates. The rate of change of slope can be thought of as the rate of change of rotation of a vector path segment. If the rate of change of slope exceeds a predetermined threshold, then the coordinates are designated in the array as a point of excessive curvature (a "collision point").

FIG. 11C is a depiction of the map of FIG. 11A after the path label ("Winding Way") has been repositioned to avoid the zone(s) where the rate of change of slope exceeds the predetermined threshold (for that particular zoom level).

Figure 12A:
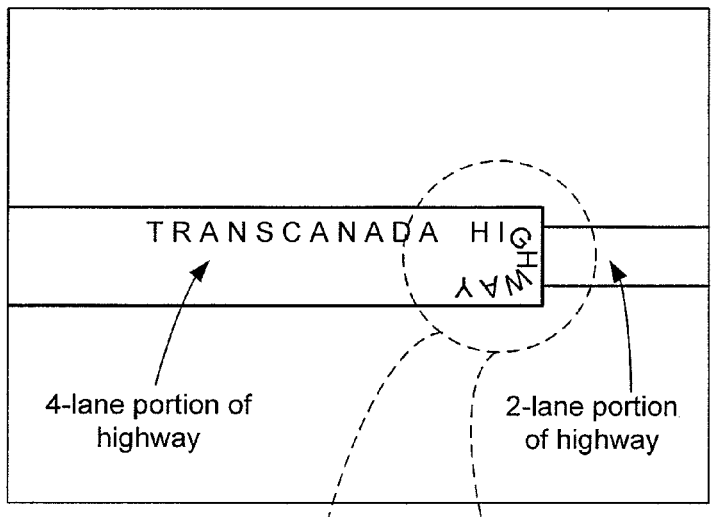
FIG. 12A depicts a map in which a 4-lane highway becomes a 2-lane highway whereupon, using conventional labelling techniques, the path label is susceptible to being wrapped or folded back on itself.
Figure 12B:
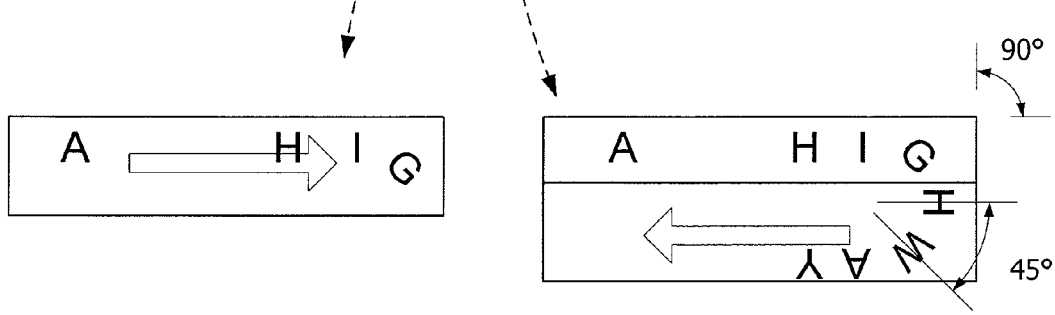
FIG. 12B depicts how slightly offset vector path segments are used to render the thickness of the 4-lane highway, thus causing the label to be wrapped or folded on itself.
Figure 12C:
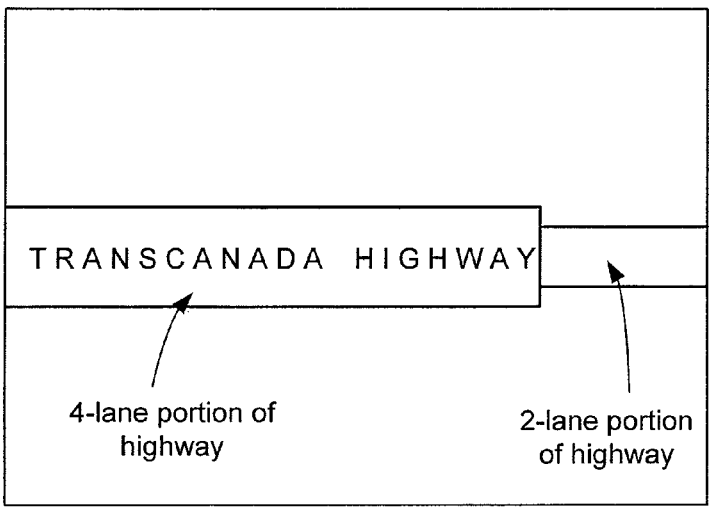
FIG. 12C depicts the map of FIG. 12A after the path label has been repositioned to avoid the zone(s) where the curvature (either of the path itself or in terms of the change in orientation of each successive label character) exceeds a predetermined threshold.

In a related scenario, conventional mapping applications typically encounter labelling problems when attempting to label a path whose girth changes. For example, as shown in FIG. 12A, a conventional mapping application will "wrap" or "fold" the label back on itself when the path transitions from a four-lane path to a two-lane path. This will occur because a conventional mapping application will render the 4-lane portion of the path in two stages, first using a first vector path segment (shown in the left-side of FIG. 12B) and then using a second slightly offset vector path segment (shown in the right-side of FIG. 12B). The result is a thicker line representing the wider four-lane highway. The narrower, two-lane portion of the highway is rendered using a vector path segment that extends normally from the four-lane portion. The labelling problem of FIG. 12A can be avoided using the new technology presented herein by exploiting the fact that four-lane to two-lane transition is in effect a drastic change in orientation of either the characters of the label or of the underlying path itself. In either case, as presented on the right side of FIG. 12B, the angular differential can be determined and compared against a predetermined threshold. In this particular case, the path turns 90 degrees. The successive characters H and W undergo a change in orientation of 45 degrees. Assuming each angular differential exceeds its respective predetermined threshold, then the transition point from four to two lanes is treated as a "collision point", i.e. a point where the rotation is too drastic to accommodate aesthetic labelling. FIG. 12C depicts the map of FIG. 12A after the path label has been repositioned to avoid the zone(s) where the curvature (either of the path itself or in terms of the change in orientation of each successive label character) exceeds the predetermined threshold.

FIG. 13 is a screenshot of a map rendered without detecting and avoiding sharp turns, showing how the path label "Columbia St W" is folded back on itself as the street transitions from four lanes to two. FIG. 14 is a screenshot of a map rendered after first detecting and avoiding sharp turns, showing how the path label "Columbia St W" is displaced to avoid the high-curvature transition point where the street goes from four to two lanes.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This new technology has been described in terms of specific implementations and configurations which are intended to be exemplary only. The scope of the exclusive right sought by the Applicant is therefore intended to be limited solely by the appended claims.

The invention claimed is:

1. A method of displaying a map on a wireless communications device, the method comprising steps of:
    obtaining map data for rendering the map to be displayed on the wireless communications device, the map data including label data for rendering a label for identifying a map feature on the map;
    determining whether a curvature of a map element associated with the map feature exceeds a predetermined threshold; and
    rendering the label on the map in a new map location that avoids the map location where the curvature exceeds the predetermined threshold.

2. The method as claimed in claim 1 wherein the step of determining whether the curvature exceeds the predetermined threshold comprises a step of determining a rate of change in slope $$\frac{\partial^2 y}{\partial x^2}$$

of a map feature at the map location where the label is to be rendered.

3. The method as claimed in claim 2 wherein the predetermined threshold varies as a function of a zoom level of the map.

4. The method as claimed in claim 2 further comprising steps of:
    generating a collision-avoidance array representative of the map to be rendered for testing potential label positions prior to actually rendering the labels on the map; and
    populating the collision-avoidance array by designating one or more undesirable locations in the array corresponding to map locations on the map where the curvature exceeds the predetermined threshold.

5. The method as claimed in claim 1 wherein the step of determining whether the curvature exceeds the predetermined threshold comprises a step of determining a rate of change in slope $$\frac{\partial^2 y}{\partial x^2}$$

of a path at the map location where the label is to be rendered.

6. The method as claimed in claim 5 wherein the predetermined threshold varies as a function of a zoom level of the map.

7. The method as claimed in claim 1 wherein the step of determining whether the curvature exceeds the predetermined threshold comprises steps of:
    virtually rendering the label along its respective path by provisionally orienting each character of the label; and
    determining whether a change in angular orientation of each character in the label relative to its preceding character in the label exceeds a predetermined angular threshold.

8. The method as claimed in claim 7 wherein the predetermined threshold varies as a function of a zoom level of the map.

9. The method as claimed in claim 7 further comprising steps of:
    generating a collision-avoidance array representative of the map to be rendered for testing potential label positions prior to actually rendering the labels on the map; and
    populating the collision-avoidance array by designating one or more undesirable locations in the array corresponding to map locations on the map where the curvature exceeds the predetermined threshold.

10. The method as claimed in claim 7 further comprising steps of:
    generating a collision-avoidance array representative of the map to be rendered for testing potential label positions prior to actually rendering the labels on the map; and populating the collision-avoidance array by designating one or more undesirable locations in the array corresponding to map locations on the map where the curvature exceeds the predetermined threshold.

11. The method as claimed in claim 1 wherein the predetermined threshold varies as a function of a zoom level of the map.

12. The method as claimed in claim 1 further comprising steps of:
generating a collision-avoidance array representative of the map to be rendered for testing potential label positions prior to actually rendering the labels on the map; and
populating the collision-avoidance array by designating one or more undesirable locations in the array corresponding to map locations on the map where the curvature exceeds the predetermined threshold.

13. A non-transitory computer readable medium comprising code adapted to perform the steps of claim 1 when the computer readable medium is loaded into memory and executed on a processor of a wireless communications device.

14. A non-transitory computer readable medium comprising code adapted to perform the steps of claim 2 when the computer readable medium is loaded into memory and executed on a processor of a wireless communications device.

15. A non-transitory computer readable medium comprising code adapted to perform the steps of claim 3 when the computer readable medium is loaded into memory and executed on a processor of a wireless communications device.

16. A non-transitory computer readable medium comprising code adapted to perform the steps of claim 4 when the computer readable medium is loaded into memory and executed on a processor of a wireless communications device.

17. A non-transitory computer readable medium comprising code adapted to perform the steps of claim 5 when the computer readable medium is loaded into memory and executed on a processor of a wireless communications device.

18. A non-transitory computer readable medium comprising code adapted to perform the steps of claim 6 when the computer readable medium is loaded into memory and executed on a processor of a wireless communications device.

19. A non-transitory computer readable medium comprising code adapted to perform the steps of claim 7 when the computer readable medium is loaded into memory and executed on a processor of a wireless communications device.

20. A non-transitory computer readable medium comprising code adapted to perform the steps of claim 8 when the computer readable medium is loaded into memory and executed on a processor of a-wireless communications device.

21. A non-transitory computer readable medium comprising code adapted to perform the steps of claim 9 when the computer readable medium is loaded into memory and executed on a processor of a wireless communications device.

22. A non-transitory computer readable medium comprising code adapted to perform the steps of claim 10 when the computer readable medium is loaded into memory and executed on a processor of a wireless communications device.

23. A non-transitory computer readable medium comprising code adapted to perform the steps of claim 11 when the computer readable medium is loaded into memory and executed on a processor of a wireless communications device.

24. A non-transitory computer readable medium comprising code adapted to perform the steps of claim 12 when the computer readable medium is loaded into memory and executed on a processor of a wireless communications device.

25. A wireless communications device for enabling a user of the device to display a map on the device, the wireless device comprising:
an input device for enabling the user to cause the device to obtain map data for rendering the map to be displayed on a display of the device, the map data including label data for rendering labels on the map for identifying one or more map features; and
a memory for storing code to instruct a processor to:
obtain map data for rendering the map to be displayed on the wireless communications device, the map data including label data for rendering a label for identifying a map feature on the map;
determine whether a curvature of a map element associated with the map feature exceeds a predetermined threshold; and
render the label on the map in a new map location that avoids the map location where the curvature exceeds the predetermined threshold.

26. The wireless communications device as claimed in claim 25 wherein the processor determines a rate of change in slope $$\frac{\partial^2 y}{\partial x^2}$$

of a map feature at the map location where the label is to be rendered.

27. The wireless communications device as claimed in claim 25 wherein the processor determines a rate of change in slope $$\frac{\partial^2 y}{\partial x^2}$$

of a path at the map location where the label is to be rendered.

28. The wireless communications device as claimed in claim 25 wherein the processor virtually renders the label along its respective path by provisionally orienting each character of the label and then determines whether a change in angular orientation of each character in the label relative to its preceding character in the label exceeds a predetermined angular threshold.

29. The wireless communications device as claimed in claim 25 wherein the predetermined threshold varies as a function of a zoom level of the map.

30. The wireless communications device as claimed in claim 25 wherein the processor generates a collision-avoidance array representative of the map to be rendered for testing potential label positions prior to actually rendering the labels on the map and then populates the collision-avoidance array by designating one or more undesirable locations in the array corresponding to map locations on the map where the curvature exceeds the predetermined threshold.

* * * * *